No. 831,091. PATENTED SEPT. 18, 1906.
B. F. PARKER.
RAILWAY GATE.
APPLICATION FILED JULY 12, 1906.
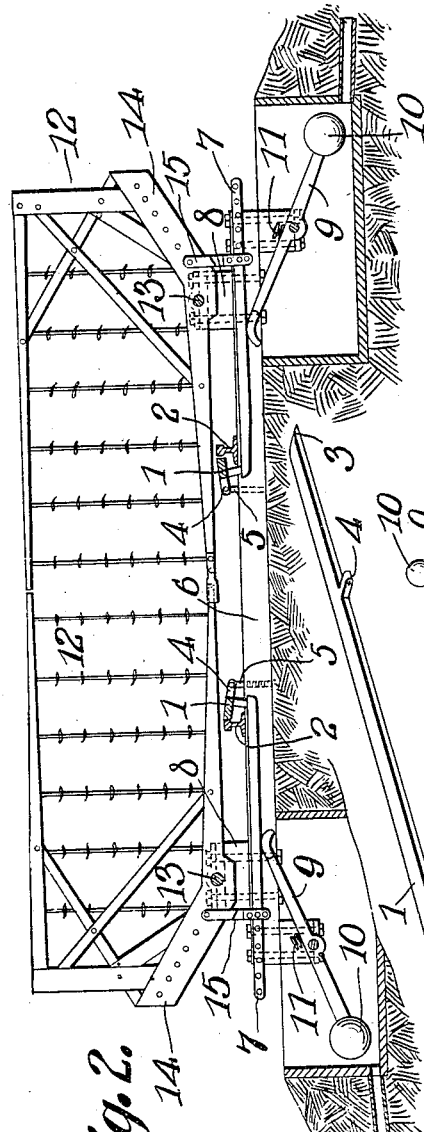
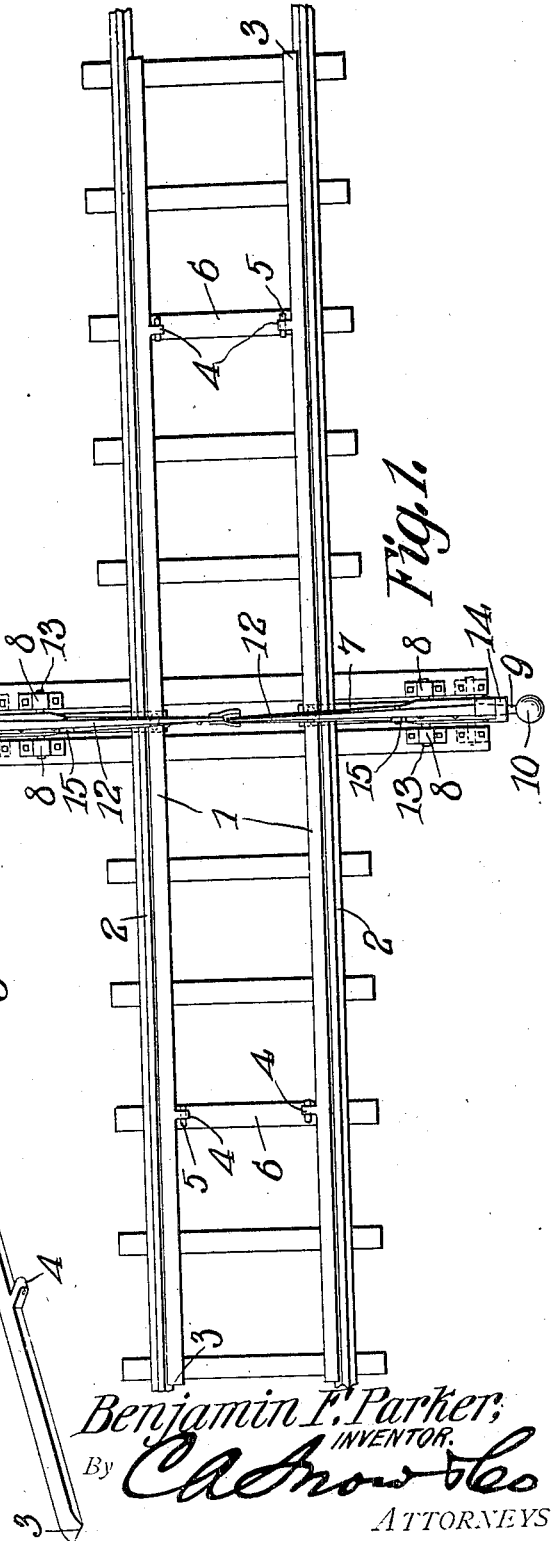
WITNESSES:
E. W. Stuart
J. A. Bishop
Benjamin F. Parker, INVENTOR.
By C. A. Snow & Co.
ATTORNEYS

UNITED STATES PATENT OFFICE.

BENJAMIN F. PARKER, OF NORTH YAKIMA, WASHINGTON.

RAILWAY-GATE.

No. 831,091.

Specification of Letters Patent.

Patented Sept. 18, 1906.

Application filed July 12, 1906. Serial No. 325,966.

*To all whom it may concern:*

Be it known that I, BENJAMIN F. PARKER, a citizen of the United States, residing at North Yakima, in the county of Yakima and State of Washington, have invented a new and useful Railway-Gate, of which the following is a specification.

This invention has relation to railway-gates; and it consists in the novel construction and arrangement of its parts, as hereinafter shown and described.

The object of the invention is to provide a gate which swings transversely across the track.

The gate is preferably composed of two members, and along the sides of the rails of the track is pivotally mounted a trip. Each trip is provided with an arm which extends under the rail. A weighted lever is suitably fulcrumed and bears at its working end against said arm and tends to maintain the arm and trip in an elevated position. The gate member is pivoted above the outer end of the said arm and is connected with the same by means of a link. The said gate member, as above stated, is adapted to swing across the track and comes into alinement with a gate member similarly located at the opposite side of the track. One of the said gate members is provided at its end with a socket adapted to receive the end of the opposite gate member. The supports upon which the trips are hinged are adapted to be adjusted vertically in order that the said trips may be properly positioned with relation to the track-rails.

In the accompanying drawings, Figure 1 is a top plan view of the gate. Fig. 2 is a side elevation of the same with parts broken away and parts in section. Fig. 3 is a side view of one of the trips.

As each gate is preferably made of two members, and as the said members and their attachments are identical in construction, with the exception that one gate member is provided with a socket adapted to receive the end of the opposite gate member when the members are closed upon the track, a description of one will answer for both gate members.

The trip 1 extends along the inner side of the track-rail 2. The said trip is normally disposed in an inclined position transversely and is provided at its ends with the beveled portions 3 3. The lugs 4 4 are formed or otherwise attached to the inner edge of the trip 1. The said lugs 4 are hinged to the upper ends of the supports 5. Said supports 5 are secured at their lower ends in the cross-ties 6. The said supports 5 are preferably screwed into the tie 6, and consequently the position of the horizontal portions of the said supports may be vertically adjusted. By such adjustment one or both ends of the trip 1 may be raised or lowered in order that the said trip may be properly positioned with relation to the track-rail 2 in order that the same may be pressed by the flange of the car-wheel.

The arm 7 is connected at its inner end at the middle of the trip 1. The gate-bearings 8 8 are located beyond the outer side of the track-rail 2, and the outer end of the arm 7 is adapted to reciprocate vertically between the said bearings 8 8. The lever 9 is fulcrumed below the outer end of the arm 7, and the working end of said lever bears against the under side of said arm 7, while the power end 10 is weighted and normally is in depressed position. The spring or buffer 11 is located upon the lever 9 in the path of the outer end of the arm 7. Consequently when the outer end of the said arm 7 is depressed it strikes the said buffer 11, and the parts are saved from unnecessary jar. The gate member 12 is provided with the transversely-extending shaft 13, which is journaled in the bearings 8 8. The said member 12 is provided with the rearwardly-extending portion 14, which is connected by means of a link 15 with the outer end of the arm 7. The inner end of one of the gate members 12 is provided with a socket 15, which is adapted to receive the end of the opposite gate member 12.

From the above description it is obvious that as a train or truck approaches the gate the flange of the car-wheel passing upon the trips 1 1 depress the same. As the said trips are pivotally mounted they describe arcs in descending, carrying down the outer ends of the arms 7. As the said outer ends of the arms sink, the gate members 12 12, through the links 15 15, are swung up and the inner ends of said gate members clear the track-rails and permit the passage of the train by the gate. As the outer ends of the arm 7 are depressed they move down the working ends of the levers 9. As soon as downward pressure is removed from the trips 1 1 the power ends of the levers 9 come into play and force the outer ends of the arm 7 up until the upper edges of said arms engage the lower edges of the track-rails 2, when in a manner the reverse of that above described the gate members 12 12 swing down over the track-rails 2 2, the socket at the end of one member 12 receiving the end of the opposite member 12. Said socket receives the opposite end in a vertical manner and retains the same against lateral strain or pressure.

Having described my invention, what I claim as new, and desire to secure by Letters Patent, is—

1. In combination with a track, a trip pivotally mounted in parallel relation thereto, supports connected to the trip at points on opposite sides of the middle thereof, said supports being adapted to be adjusted vertically independent of each other, and a pivoted gate operatively connected with said trip.

2. In combination with a track, a trip suitably pivoted, an arm attached to the trip and extending under the track, a pivoted gate a link pivoted at one end to the gate and at its other end to said arm, and means for normally maintaining said arm in an elevated position.

3. In combination with a track, a trip suitably pivoted, an arm connected with said trip, a lever suitably fulcrumed and having a weighted power end, the working end of said lever bearing against said arm, a gate suitably pivoted and operatively connected with said arm.

4. In combination with a track, a trip suitably pivoted, an arm connected with said trip and extending under the track and when in elevated position bearing against the lower edge of the track, a lever suitably fulcrumed and engaging said arm and normally maintaining the same in elevated position, and a gate pivotally supported and operatively connected with said arm.

5. In combination with a track, a trip suitably pivoted, an arm attached to the trip and extending under the track, a pivoted gate, a link and means for adjustably attaching one end thereof to the gate and adjustably attaching the other end thereof to the arm and means for normally maintaining said arm in an elevated position.

In testimony that I claim the foregoing as my own I have hereto affixed my signature in the presence of two witnesses.

BENJAMIN F. PARKER.

Witnesses:
 ISAAC BROOKS,
 JAMES T. PARKER.